(12) United States Patent
Noro et al.

(10) Patent No.: US 6,806,688 B2
(45) Date of Patent: Oct. 19, 2004

(54) DIFFERENCE POWER ADJUSTMENT APPARATUS HAVING A CAPACITOR AND REACTOR CONNECTED POWER-SYSTEM BUS

(75) Inventors: Yasuhiro Noro, Hino (JP); Kenji Kudo, Koshigaya (JP); Yoshihisa Sato, Koganei (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/138,409

(22) Filed: May 6, 2002

(65) Prior Publication Data

US 2002/0167298 A1 Nov. 14, 2002

(30) Foreign Application Priority Data

May 10, 2001 (JP) .................................... 2001-140343

(51) Int. Cl.$^7$ .............................. H02P 7/28; H02P 6/00; H02P 9/14; G05F 5/04
(52) U.S. Cl. ........................................ 322/20; 323/215
(58) Field of Search .............. 322/17, 20; 323/212–219

(56) References Cited

U.S. PATENT DOCUMENTS

| | | | | |
|---|---|---|---|---|
| 2,652,529 A | * | 9/1953 | Alexanderson | 323/210 |
| 3,400,326 A | * | 9/1968 | Zuhkov et al. | 323/210 |
| 3,422,343 A | * | 1/1969 | Specht et al. | 323/205 |
| 3,450,983 A | * | 6/1969 | Koppelmann et al. | 323/210 |
| 3,471,708 A | * | 10/1969 | Rauhut et al. | 307/85 |
| 3,675,117 A | * | 7/1972 | Reimers | 322/31 |
| 3,753,060 A | * | 8/1973 | Greenwell | 318/801 |
| 3,753,062 A | * | 8/1973 | Greenwell | 318/810 |
| 3,754,184 A | * | 8/1973 | Stone | 323/210 |
| 3,780,324 A | * | 12/1973 | Greenwell | 310/180 |
| 3,829,759 A | * | 8/1974 | Thorborg | 323/207 |
| 3,838,322 A | * | 9/1974 | Greenwell | 318/810 |
| 3,854,077 A | * | 12/1974 | Greenwell | 318/808 |
| 3,855,519 A | * | 12/1974 | Waldmann | 322/20 |
| 3,936,727 A | * | 2/1976 | Kelley et al. | 323/210 |
| 3,963,978 A | * | 6/1976 | Kelley et al. | 323/210 |
| 3,968,432 A | * | 7/1976 | Kelley, Jr. | 324/107 |
| 3,983,469 A | * | 9/1976 | Brown | 363/48 |
| 3,999,117 A | * | 12/1976 | Gyugyi et al. | 323/211 |
| 4,028,614 A | * | 6/1977 | Kelley, Jr. | 323/210 |
| 4,037,155 A | * | 7/1977 | Ahmed | 324/133 |
| 4,292,531 A | * | 9/1981 | Williamson | 290/14 |
| 4,375,051 A | * | 2/1983 | Theall | 333/17.3 |
| 4,590,416 A | * | 5/1986 | Porche et al. | 323/205 |
| 4,994,684 A | * | 2/1991 | Lauw et al. | 290/52 |
| 5,111,377 A | * | 5/1992 | Higasa et al. | 363/95 |
| 5,166,597 A | * | 11/1992 | Larsen et al. | 323/215 |
| 5,239,251 A | * | 8/1993 | Lauw | 318/767 |
| 5,343,139 A | * | 8/1994 | Gyugyi et al. | 323/207 |
| 5,469,044 A | * | 11/1995 | Gyugyi et al. | 323/207 |

(List continued on next page.)

FOREIGN PATENT DOCUMENTS

| | | |
|---|---|---|
| JP | 62-50913 | 3/1987 |
| JP | 10-322910 | 10/1998 |
| JP | 2001-157365 | 6/2001 |
| JP | 2001-169462 | 6/2001 |

*Primary Examiner*—Nicholas Ponomarenko
*Assistant Examiner*—Pedro J. Cuevas
(74) *Attorney, Agent, or Firm*—Oblon, Spivak, McClelland, Maier & Neustadt, P.C.

(57) ABSTRACT

A power adjustment apparatus includes a phase shifter including a stator having a stator winding and a rotor having a rotor winding, a winding terminal of one of the stator winding and the rotor winding being connected to a power-system bus, and a winding terminal of the other being connected to the power-system bus via an impedance load, a driver axially coupled to the rotor to drive the rotor, and a controller which gives the driver a command value to adjust the phase difference between the stator and the rotor to a desired value.

11 Claims, 6 Drawing Sheets

U.S. PATENT DOCUMENTS

| | | | |
|---|---|---|---|
| 5,608,615 A | * 3/1997 | Luce | 363/102 |
| 5,691,625 A | * 11/1997 | Kumar et al. | 322/20 |
| 5,731,689 A | * 3/1998 | Sato | 322/25 |
| 5,736,838 A | * 4/1998 | Dove et al. | 323/211 |
| 5,808,880 A | * 9/1998 | Marvin | 363/37 |
| 5,841,267 A | * 11/1998 | Larsen | 323/215 |
| 5,991,327 A | * 11/1999 | Kojori | 373/104 |
| 6,008,616 A | * 12/1999 | Nagayama et al. | 318/773 |
| 6,051,941 A | * 4/2000 | Sudhoff et al. | 318/140 |
| 6,476,571 B1 | * 11/2002 | Sasaki | 318/139 |
| 6,573,691 B2 | * 6/2003 | Ma et al. | 323/209 |
| 6,628,103 B2 | * 9/2003 | Sumiya et al. | 322/20 |

* cited by examiner

DIFFERENCE POWER ADJUSTMENT APPARATUS HAVING A CAPACITOR AND REACTOR CONNECTED POWER-SYSTEM BUS

CROSS-REFERENCE TO RELATED APPLICATIONS

This application is based upon and claims the benefit of priority from the prior Japanese Patent Application No. 2001-140343, filed May 10, 2001, the entire contents of which are incorporated herein by reference.

BACKGROUND OF THE INVENTION

1. Field of the Invention

The present invention relates to a power adjustment apparatus which connects a phase shifter to a power-system bus and controls the phase shifter to continuously adjust the active power or reactive power.

2. Description of the Related Art

Conventionally, the power of a large-capacity load is adjusted by, except when the load itself has an adjusting function, connecting the load to the secondary side of a tapped transformer and changing the magnitude of a voltage to be supplied to the load by changing the tap, thereby adjusting the active power or reactive power consumed by the load.

Unfortunately, the operation of the tapped transformer is to change the voltage stepwise by a tap changer. Therefore, the tapped transformer is unsuitable to finely adjusting a voltage in accordance with the state of a system. Also, tap changing takes a long time, and the operation cost increases because the tap changer requires frequent maintenance.

It is also possible to perform adjustment rapidly and continuously by using a power electronics type power converter. However, the method requires a high cost and relatively increases power loss.

Meanwhile, proposals for realizing continuous voltage control by using an induction type phase shifter (to be referred to as a "phase shifter" hereinafter) have been made. Proposed methods of this type are a first method in which the phase shifter is connected in series with a bus (e.g., Jpn. Pat. Appln. KOKAI Publication No. 10-322910 (original application is U.S. patent Ser. No. 08/814,374), Jpn. Pat. Appln. KOKAI Publication No. 2001-157365 (original application is U.S. patent Ser. No. 09/443,220), and Jpn. Pat. Appln. KOKAI Publication No. 2001-169462), and a second method in which the phase shifter is connected in parallel with a bus (Jpn. Pat. Appln. KOKAI Publication No. 62-50913).

In the first method, to suppress power fluctuations, power is passed through the phase shifter to adjust the active power or reactive power. Therefore, the phase shifter must be given a capacity which allows the total power to pass through. This requires a large-capacity phase shifter. In addition, maintenance and the like are very difficult to perform because the phase shifter is connected in series with a bus.

In the second method, the phase shifter is connected in parallel with a bus, so fluctuations can be controlled without any passage of power. Therefore, the phase shifter need only have a capacitor corresponding to the fluctuations. In addition, maintenance and the like can be performed only by disconnecting the phase shifter from the bus. This makes the maintenance and the like very easy to perform. However, the purpose of the second method is to adjust only the reactive power, so a transformer is connected in parallel with the phase shifter. Also, the second method particularly adjusts the lagging reactive power. Hence, the leading reactive power and the active power cannot be adjusted.

BRIEF SUMMARY OF THE INVENTION

It is an object of the present invention to provide a power adjustment apparatus which can perform fine adjustment in accordance with a load power command and which reduces power loss.

A power adjustment apparatus according to a first aspect of the present invention is characterized by comprising: a phase shifter including a stator having a stator winding and a rotor having a rotor winding, a winding terminal of one of the stator winding and the rotor winding being connected to a power-system bus, and a winding terminal of the other being connected to the power-system bus via an impedance load; a driver axially coupled to the rotor to drive the rotor; and a controller which outputs a command to the driver value to adjust a phase difference between the stator and the rotor to a desired value.

A power adjustment apparatus according to a second aspect of the present invention is characterized by comprising: a phase shifter including a stator having a stator winding and a rotor having a rotor winding, winding terminals of the stator winding and the rotor winding being connected to a power-system bus; a driver axially coupled to the rotor to drive the rotor; and a controller which outputs a command to the driver value to adjust a phase difference between the stator and the rotor to a desired value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
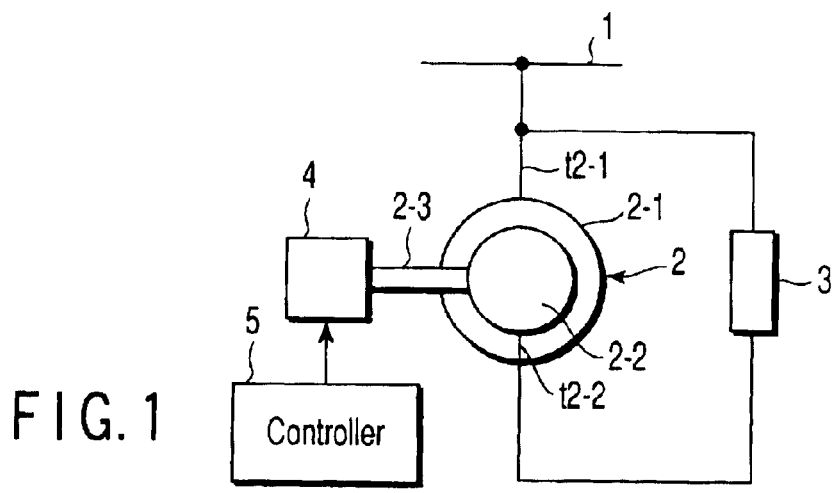
FIG. 1 is a block diagram showing a power adjustment apparatus according to the first embodiment of the present invention.

FIG. 1 is a block diagram showing a power adjustment apparatus according to the first embodiment of the present invention. Referring to FIG. 1, a three-phase AC power-system bus 1 is provided in a power plant, substation, or consumer's house. A phase shifter 2 includes a stator 2-1 having a stator winding and a rotor 2-2 having a rotor winding, similar to a wound-rotor induction motor or a rotating transformer. A winding terminal t2-1 of the phase shifter 2 is connected to the power-system bus 1. A winding terminal t2-2 of the phase shifter 2 is connected to the power-system bus 1 via an impedance load 3.

In the phase shifter 2, the rotor can freely rotate as in a common induction motor or induction generator, or the rotating angle of the rotor can be limited to a predetermined range (e.g., 0° to 180°) as in an induction voltage adjuster. For the sake of an easy understanding of the invention, in the specification an explanation will be made by assuming that the rotor 2-2 rotates within the range of 0° to 180°.

In the arrangement shown in FIG. 1, the winding terminal t2-1 of the stator is connected to the power-system bus 1, and the winding terminal t2-2 of the rotor is connected to the power-system bus 1 via the impedance load 3. However, the connection relationship can also be reversed; the winding terminal t2-1 of the stator can be connected to the power-system bus 1 via the impedance load 3, and the winding terminal t2-2 of the rotor can be connected directly to the power-system bus 1. Even in a case like this, the same functions and effects as described below can be achieved.

A driving system 4 is mechanically coupled to a shaft 2-3 of the rotor 2-2 of the phase shifter 2 and rotates the rotor 2-2 within the above-mentioned predetermined angle (0° to 180°). The rotating angle is adjusted by a controller 5.

The operation of the first embodiment will be explained below with reference to FIG. 2. In the following explanation, assume that the winding ratio of the stator winding to the rotor winding of the phase shifter 2 is 1:1.

Figure 2:
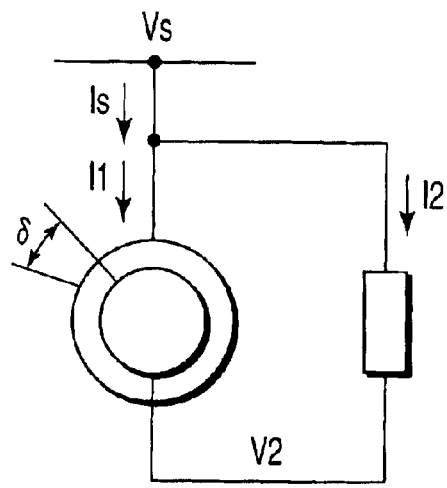
FIG. 2 is a diagram for explaining the relationship between the voltage and the current in the power adjustment apparatus according to the first embodiment of the present invention.

The relationships between voltages Vs and V2 and electric currents I1, I2, and Is in FIG. 2 are represented by the following equations (1) to (4). In equations (1) to (4), Vs is the voltage of the power-system bus 1. V2 is the voltage of the rotor 2-2. Is is an electric current flowing between the power-system bus 1 and the phase shifter 2. I1 is an electric current flowing through the stator 2-1. I2 is an electric current flowing through the rotor 2-2. Z is the impedance of the impedance load 3. Note that for the sake of simplicity, the excitation current and the leakage impedance (Z1) of the phase shifter are ignored.

$$Is = I1 + I2 \quad (1)$$

$$V2 = Vs - I2 \cdot Z \quad (2)$$

$$V2 = Vs \cdot \exp(-j\delta) \quad (3)$$

$$-I2 = I1 \cdot \exp(-j\delta) \quad (4)$$

When the relationship between Is and Vs is calculated from the above equations, the following equation (5)

$$Is = 2 \cdot Vs/Z \cdot (1 - \cos \delta) \quad (5)$$

Can be obtained.

Figure 3:
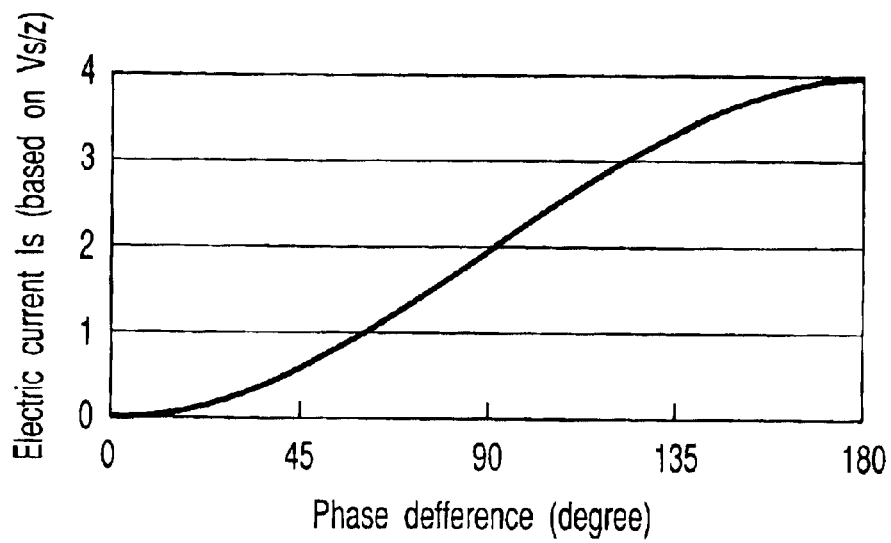
FIG. 3 is a graph showing the function of the power adjustment apparatus according to the first embodiment of the present invention.

Equation (5) means that the output current Is changes in accordance with the phase difference δ between the stator 2-1 and the rotor 2-2 as shown in FIG. 3. Note that the power consumption in the impedance load 3 can be continuously adjusted as shown in FIG. 3, by adjusting the phase difference δ (0° to 180°).

As seen from equation (5), when the phase difference δ between the stator 2-1 and the rotor 2-2 is 0°, the value in the parentheses on the right-hand side is 0. Accordingly, Is=0, i.e., the power consumed by the impedance load 3 is zero. When the phase difference δ is 180°, the value in the parentheses on the right-hand side is 2. So, Is=4·Vs/Z, i.e., the power consumption is a maximum.

In the first embodiment, the controller 5 calculates the phase difference δ with respect to a predetermined power amount, i.e., the load power command, from equation (5). On the basis of the phase difference δ, the driving system 4 rotates the rotor 2-2 through a predetermined angle. This produces the predetermined phase difference δ between the voltages of the rotor 2-2 and the stator 2-1.

In this case, when the both of mechanical phase differences are δ, the voltage whose magnitude is the same as the voltages of the stator 2-1 and whose phase difference is δ is induced to the rotor 2-2. Then, in the impedance load 3, the power in accordance with the phase difference δ, i.e., the predetermined power amount is consumed.

In the first embodiment as described above, the power is not changed stepwise unlike in a tapped transformer, but the power consumed by the impedance 3 between the stator 2-1 and the rotor 2-2 is continuously controlled. Accordingly, the power can be continuously controlled on demand in the power system and in the load. This allows fine power adjustment with respect to a demand for a predetermined power amount. Also, the power adjustment apparatus according to the first embodiment has an arrangement simpler than that of a system using a power electronics type power converter, and hence can be implemented by a low cost.

In the above first embodiment, the type of the impedance load 3 is not particularly referred to, but various passive elements are applicable. For example, a resistance load (R), a reactor load (L), or a capacitor load (C) is applicable as the impedance load 3.

When various passive elements are connected as the impedance load 3 as described above, the following power adjustment can be performed. For example, the resistance load R can continuously adjust the active power, the reactor L can continuously adjust the lagging reactive power, and the capacitor C can continuously adjust the leading reactive power.

Figure 4:
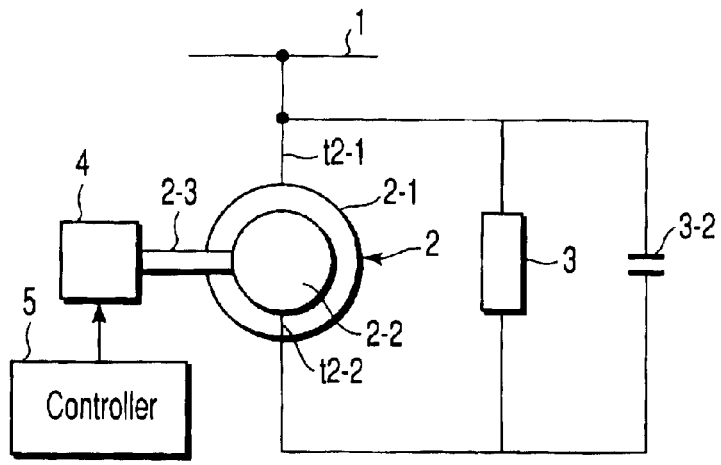
FIG. 4 is a block diagram showing a power adjustment apparatus according to a modification of the first embodiment of the present invention.

Furthermore, when the impedance load 3 is implemented by combining these resistance load, reactor, and capacitor, a load having an arbitrary power factor can be realized. This configuration is shown in FIG. 4. Referring to FIG. 4, a resistance load 3-1 and a capacitor 3-2 are connected in parallel as the impedance load 3. Consequently, both the active power and the reactive power can be adjusted.

Second Embodiment

Figure 5:
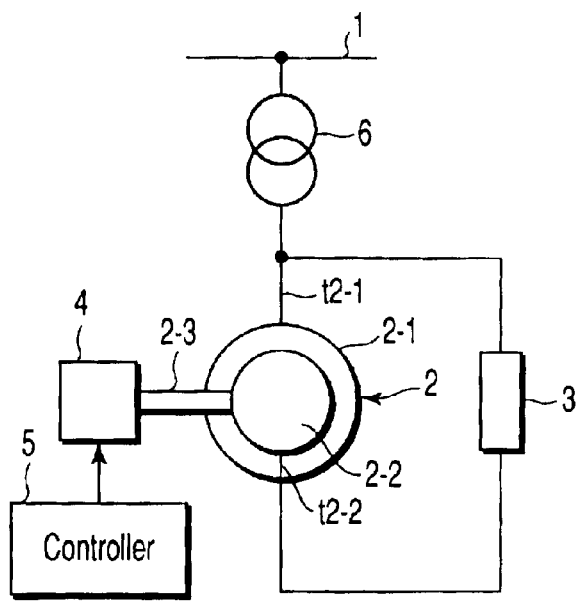
FIG. 5 is a block diagram showing a power adjustment apparatus according to the second embodiment of the present invention.

FIG. 5 is a block diagram showing a power adjustment apparatus according to the second embodiment of the present invention. The same reference numerals as in FIG. 1 denote the same parts in FIG. 5, and a detailed description thereof will be omitted. Referring to FIG. 5, a transformer 6 is added between a power-system bus 1 and a phase shifter 2.

Generally, the bus voltages in power plants and substations are often very high in order to supply large power and reduce the power supply loss. Directly connecting the phase shifter 2 of the apparatus of the present invention to such a power-system bus is disadvantageous in respect of insulation. In the second embodiment, therefore, the step-down transformer 6 (a step-down transformer for the power-system bus 1 and a step-up transformer for the phase shifter 2) is interposed between the power-system bus 1 and the phase shifter 2. Therefore, the rated voltages of the phase shifter 2 and an impedance load 3 can be freely chosen.

Accordingly, the second embodiment can provide a power adjustment apparatus which achieves easy insulation design in addition to the effects of the first embodiment, at a lower cost.

Third Embodiment

Figure 6:
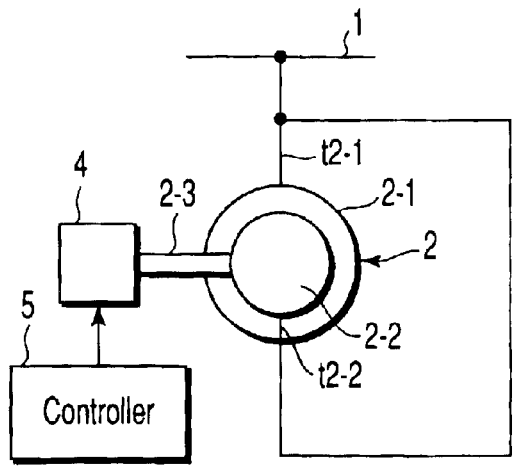
FIG. 6 is a block diagram showing a power adjustment apparatus according to the third embodiment of the present invention.

FIG. 6 is a block diagram showing a power adjustment apparatus according to the third embodiment of the present invention. The same reference numerals as in FIG. 1 denote the same parts in FIG. 6, and a detailed description thereof will be omitted. Referring to FIG. 6, an impedance load 3 is omitted by directly connecting the stator and rotor of a phase shifter 2. That is, in the third embodiment, power is consumed by the leakage impedance (Z1) of the stator and rotor, as in the impedance load 3 in the first embodiment.

The phase shifter 2 usually has a leakage impedance (Z1). In the third embodiment, the leakage impedance (Z1) is positively used to consume the power. In this case, the most component of the leakage impedance (Z1) is a reactance. Accordingly, the configuration of the third embodiment consumes the lagging reactive power. Consequently, the lagging reactive power can be adjusted in accordance with a phase difference δ between the stator and rotor.

In the third embodiment, therefore, the effect of power adjustment of the first embodiment can be provided with a simpler arrangement, i.e., a lower cost.

Fourth Embodiment

Figure 7:
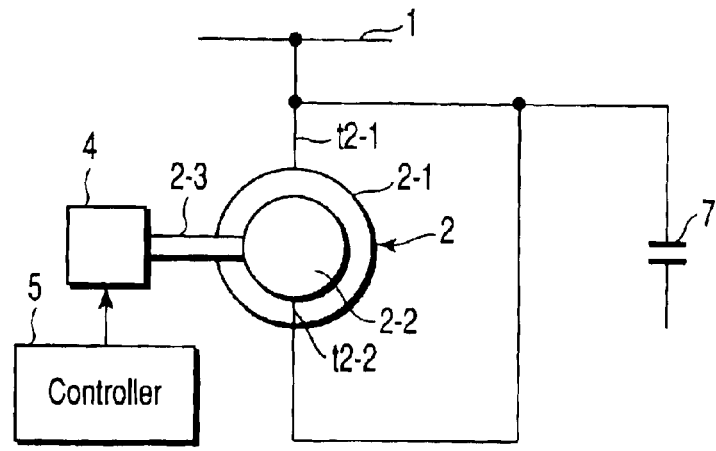
FIG. 7 is a block diagram showing a power adjustment apparatus according to the fourth embodiment of the present invention.

FIG. 7 is a block diagram showing a power adjustment apparatus according to the fourth embodiment of the present invention. The same reference numerals as in FIG. 6 denote the same parts in FIG. 7, and a detailed description thereof will be omitted. Referring to FIG. 7, a capacitor 7 connected in parallel with a phase shifter 2 is added.

In the fourth embodiment, the capacitor 7 which supplies a leading reactive power having a predetermined value is combined with the phase shifter 2 capable of adjusting a lagging reactive power in accordance with the phase difference between a stator 2-1 and a rotor 2-2. Therefore, by appropriately setting the reactance and capacitance of these components, the total reactive power supplied from the phase shifter 2 to a power-system bus 1 can be continuously adjusted within a broad range from a lead to a lag.

In the above explanation, the added capacitor 7 is combined with the leakage impedance shown in FIG. 6. However, even when a reactor, instead of the impedance load 3 shown in FIG. 1, is connected in parallel with the capacitor 7, the same function and effect can be obtained.

Fifth Embodiment

Figure 8:
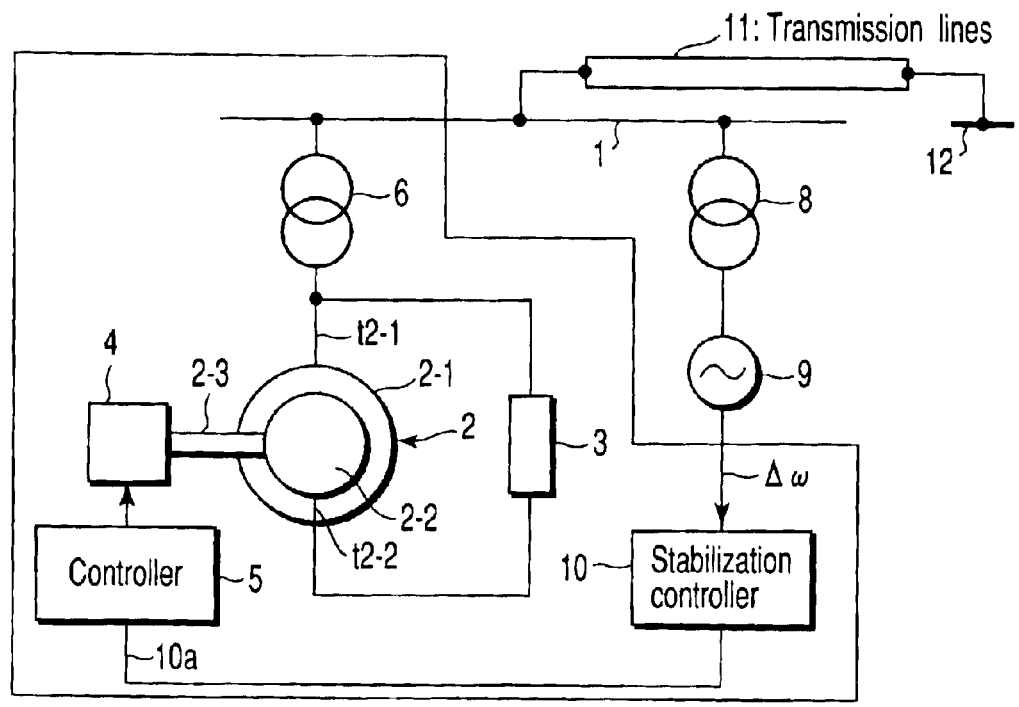
FIG. 8 is a block diagram showing a power adjustment apparatus according to the fifth embodiment of the present invention.

FIG. 8 is a block diagram showing a power adjustment apparatus according to the fifth embodiment of the present invention. The same reference numerals as in FIG. 1 denote the same parts in FIG. 8, and a detailed description thereof will be omitted. In the fifth embodiment, a transformer 8, a generator 9, and a power system stabilizing system 10 are added. The generator 9 is connected to a power-system bus 1 via the transformer 8. A rotating speed deviation Δω of the generator 9 is input to the power system stabilizing system 10, and an operation result from the power system stabilizing system 10 is output as a change in a command value to a controller 5. The generator 9 is connected to a substation bus 12 via two long-distance parallel transmission lines 11.

Figure 9:
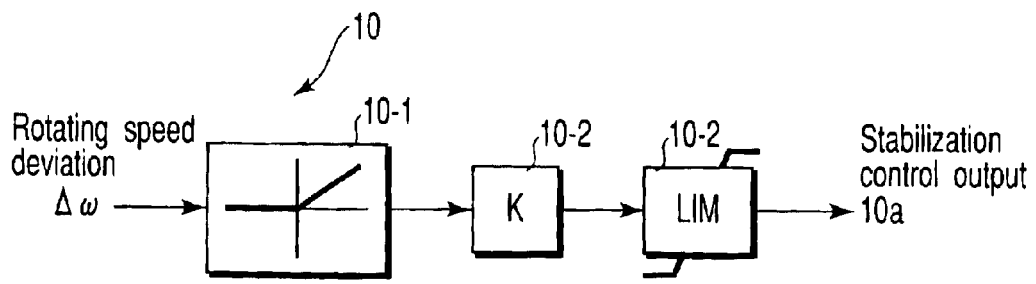
FIG. 9 is a block diagram showing the arrangement of a power system stabilizing system used in the fifth embodiment.

The configuration of the power system stabilizing system 10 will be explained below with reference to FIG. 9. As shown in FIG. 9, the power system stabilizing system 10 includes a positive value detector 10-1, a gain unit 10-2, and an output limiter 10-3.

The positive value detector 10-1 receives the rotating speed deviation Δω of the generator 9 and outputs only a positive value (corresponding to a period during which the rotating speed increases) of the speed deviation Δω. The output is supplied to the gain unit 10-2. The gain unit 10-2 multiplies the received output by an appropriate control gain K (the gain is determined by the actually applied system conditions and the capacities of the generator and the power adjustment apparatus). With the above operation, an operation shown in FIG. 10B to be described later is obtained.

The output limiter 10-3 limits the magnitude of a stabilization control output 10a from the power system stabilizing system 10 to a proper range. For example, a stabilization control output 10a exceeding the power adjusting range of a phase shifter 2 is not only meaningless but also sometimes has an adverse effect on a controller 5 and a driving system 4. The adverse effect is prevented by limiting the magnitude of the stabilization control output 10a to the proper range.

If a line-to-ground fault or the like occurs on one of the two parallel transmission lines 11, a protective relay (not shown) opens the faulty line. Since this makes only one transmission line 11 available, the line impedance increases. It is well known that, as a consequence, the limit of power which can be stably transmitted lowers, so the transient stability can no longer be held in some instances.

It is also well known that under the circumstances, the stability limit can be improved if the power-system bus 1 absorbs the active power corresponding to the speed deviation Δω of the generator 9. This is so because when the speed deviation of the generator is large, the qualitatively means that the generator is accelerating, and so the input torque from a prime mover (not shown) of the generator 9 exceeds the electrical output from the generator 9. If under the circumstances a source of absorbing the active power is connected to the power-system bus 1, the electrical output from the generator 9 increases, and this suppresses the speed rise.

Figure 10A:
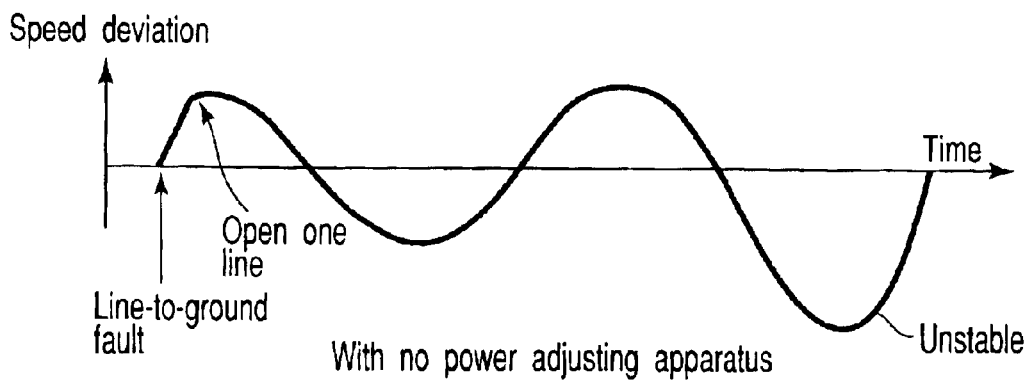
FIGS. 10A and 10B are timing charts for explaining the function of the power adjustment apparatus according to the fifth embodiment.
Figure 10B:
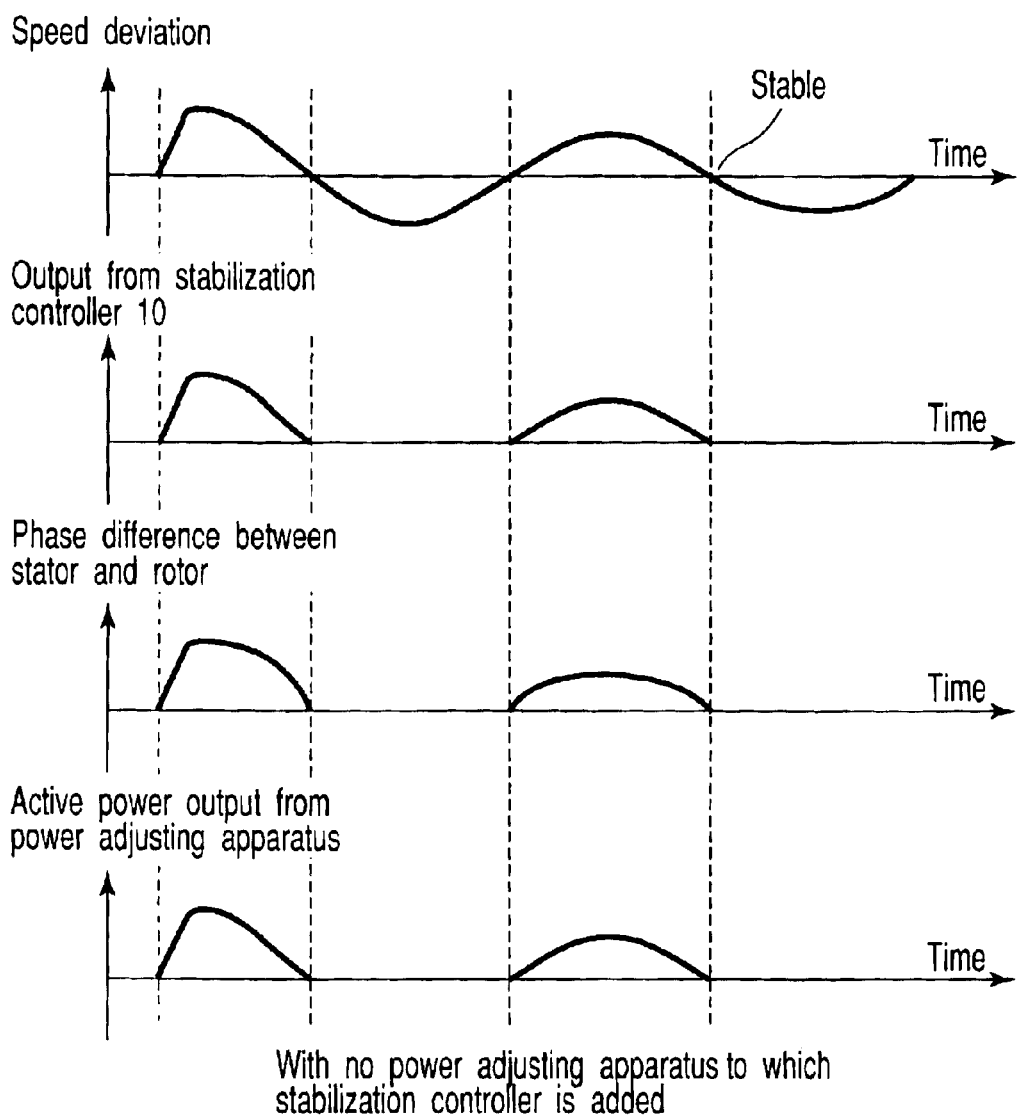

In the fifth embodiment, therefore, as indicated by operating waveforms in FIG. 10B, if the rotating speed deviation Δω of the generator 9 rises, in accordance with this rise the power system stabilizing system 10 sends to the controller 5 a command value so as to increase the power consumed by a resistor of an impedance load 3. The rotor is rotated by the operation of the driving system 4, thereby adjusting the phase difference between the rotor and the stator. Consequently, the active power can be adjusted.

In the fifth embodiment, the active power can be adjusted in accordance with the speed deviation Δω of the generator 9. This can improve the stability limit of the power system.

Although the speed deviation Δω of the generator 9 is input to the power system stabilizing system 10 in the above explanation, the speed deviation Δω is closely related to the active power output from the generator 9. Therefore, the active power output can also be input to the power system stabilizing system 10. Even in this case, a similar effect can be obtained by taking account of the dynamic relationship between the speed deviation Δω and the active power in the power system stabilizing system 10.

Sixth Embodiment

Figure 11:
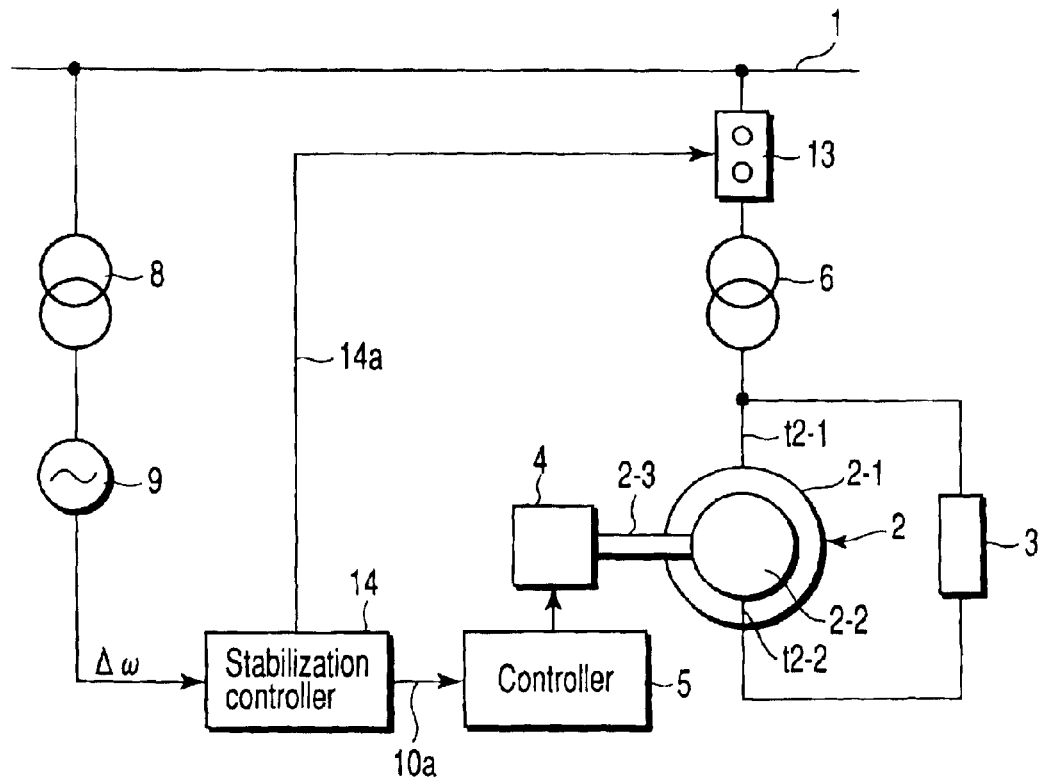
FIG. 11 is a block diagram showing a power adjustment apparatus according to the sixth embodiment of the present invention.

FIG. 11 is a block diagram showing a power adjustment apparatus according to the sixth embodiment of the present invention. The same reference numerals as in FIG. 8 denote the same parts in FIG. 11, and a detailed description thereof will be omitted. Referring to FIG. 11, a circuit breaker 13 is added between a power-system bus 1 and a transformer 6. The circuit breaker 13 is closed or opened in accordance with an output from a power system stabilizing system 14. Note that transmission lines 11 and a bus 12 are connected in the same manner as in FIG. 8, although they are omitted in FIG. 11.

Figure 12:
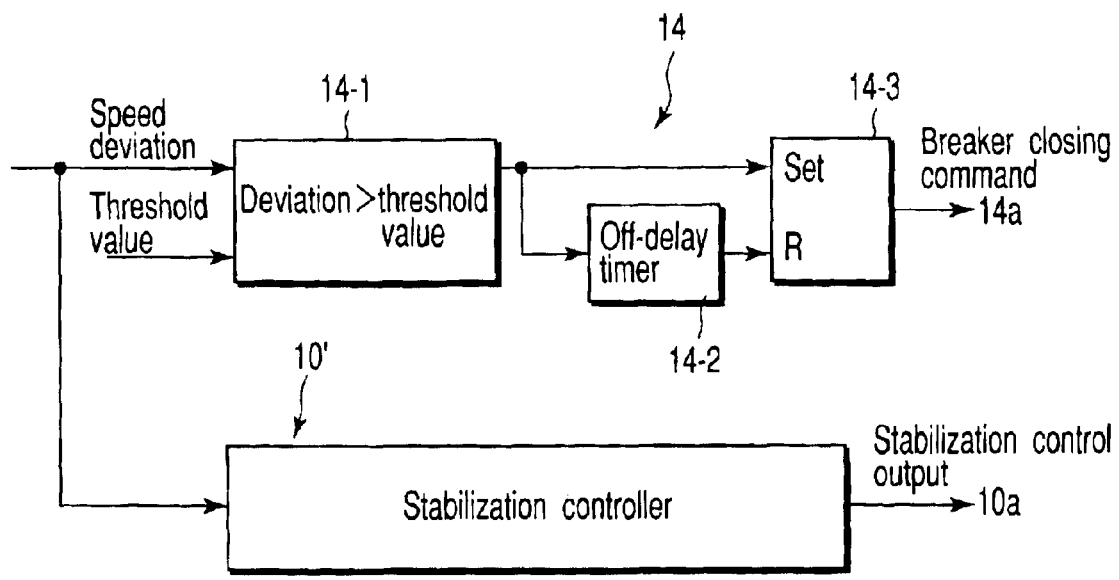
FIG. 12 is a block diagram showing the arrangement of a power system stabilizing system according to the sixth embodiment.

FIG. 12 is a block diagram showing the configuration of the power system stabilizing system 14 according to the sixth embodiment. In addition to the power system stabilizing system 10 shown in FIG. 9 (in the embodiment, a stabilization control unit 10'), the power system stabilizing system 14 includes a threshold value setting circuit 14-1, an off-delay timer 14-2, and a set-reset-type flip-flop circuit 14-3. In the threshold value setting circuit 14-1, a threshold value is preset by which the circuit does not operate by a minor disturbance and operates by a major disturbance against which stabilization control is necessary.

In the above configuration, the circuit breaker 13 is kept open when a generator 9 is stably operated in steady state and a phase shifter 2 need not absorb the active power. If the phase shifter 2 is required to absorb the active power owing to a failure in the power system or the like, the circuit breaker 13 is closed by a command from the power system stabilizing system 14.

The operation of the power system stabilizing system 14 in this case will be explained below. If a speed deviation Δω output from the generator 9 exceeds the set value in the threshold value setting circuit 14-1, a set signal is input to the flip-flop circuit 14-3. Accordingly, the flip-flop circuit 14-3 is set to output a closing command 14a to the circuit breaker 13.

If the speed deviation Δω of the generator 9 becomes smaller than the threshold value and this state is maintained even after a predetermined time (td) of the off-delay timer 14-2 has elapsed, it is determined that the power system has stabilized. Consequently, the flip-flop circuit 14-3 is reset by receiving an output reset signal from the off-delay timer 14-2. This cancels the circuit breaker closing command 14a. Note that the operation of the stabilization control unit 10' is the same as the power system stabilizing system 10 according to the fifth embodiment, so a detailed description thereof will be omitted.

In the sixth embodiment as described above, in normal state the phase shifter 2 is electrically isolated from the power-system bus 1, so a loss caused by the excitation current or the like can be prevented. Also, in normal state no power consumption occurs even if the phase difference between the stator and the rotor is not zero. Therefore, the operation start time can be shortened by setting an appropriate phase difference in advance during standby. This reduces the driving energy (cost) of a driving system 4.

Seventh Embodiment

Figure 13:
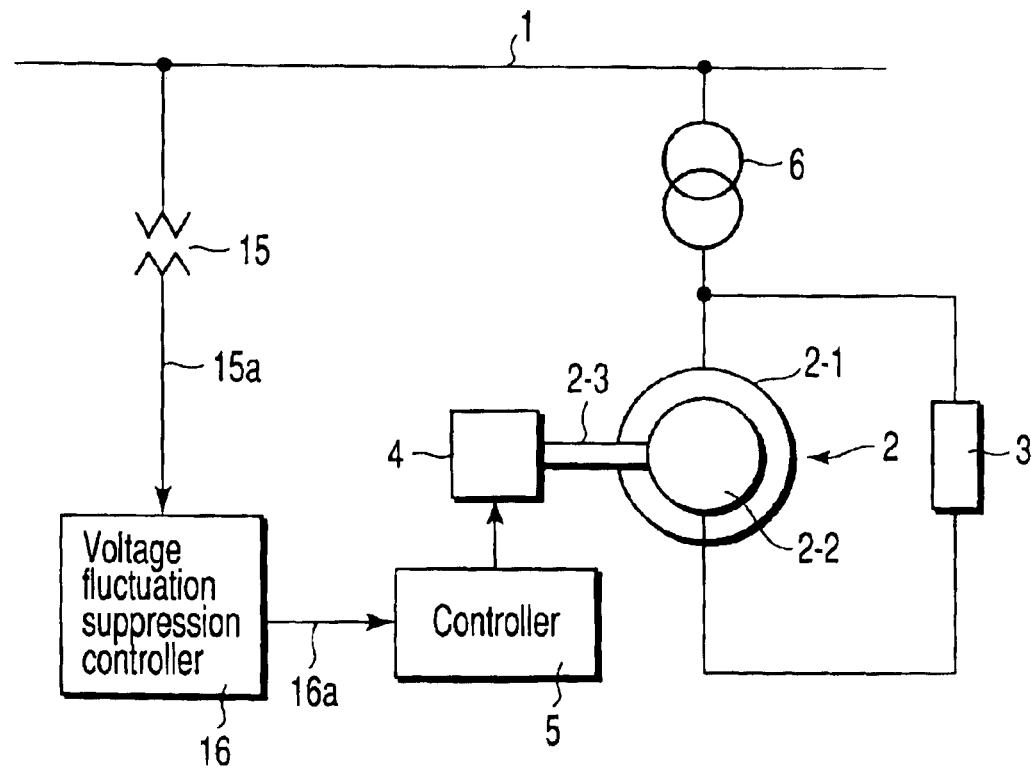
FIG. 13 is a block diagram showing a power adjustment apparatus according to the seventh embodiment of the present invention.

FIG. 13 is a block diagram showing a power adjustment apparatus according to the seventh embodiment of the present invention. The same reference numerals as in FIG. 1 denote the same parts in FIG. 13, and a detailed description thereof will be omitted. In the seventh embodiment, an impedance load 3 is a reactor or capacitor, and a capacitor 7 is connected in parallel with a phase shifter 2 as in the fourth embodiment (FIG. 7).

In the seventh embodiment, the power adjustment apparatus further comprises a voltage transformer 15 connected to a power-system bus 1, and a voltage fluctuation suppression controller 16 which receives an output signal 15a from the voltage transformer 15. A controller 5 is controlled by an output signal 16a from the voltage fluctuation suppression controller 16.

Figure 14:
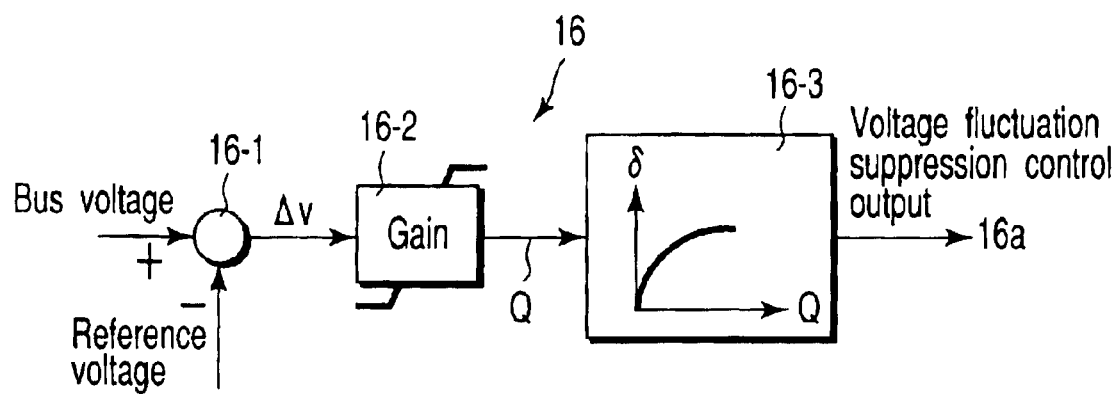
FIG. 14 is a block diagram showing a power fluctuation suppression controller used in the seventh embodiment.

FIG. 14 is a block diagram showing the configuration of the voltage fluctuation suppression controller 16. The voltage fluctuation suppression controller 16 includes an adder 16-1, a gain unit 16-2, and a reactive power reference value Q-phase difference δ converter 16-3. The adder 16-1 subtracts a reference voltage from the detected value of the voltage of the power-system bus 1, thereby calculating a voltage deviation ΔV. The gain unit 16-2 multiplies the voltage deviation ΔV by a gain to generate a reactive power reference value Q. The output range of the reactive power reference value Q is limited to a proper range by a limiter. The reactive power reference value Q-phase difference δ converter 16-3 converts the reactive power reference value Q into a phase difference δ between the stator and the rotor, thereby outputting a voltage fluctuation suppression control output 16a (when the impedance load 3 is a reactor).

As already described above, when the impedance load 3 is a reactor, the lagging reactive power can be adjusted in accordance with the phase difference between the stator and the rotor. It is well known that in a general power system, the power-system bus voltage lowers when the lagging reactive power is connected to a power-system bus.

The value of the voltage of the power-system bus 1 is detected via the voltage transformer 15. If the voltage of the power-system bus 1 rises, the voltage fluctuation suppression controller 16 controls the controller 5 to increase the phase difference δ between the stator and the rotor, such that the output of the lagging reactive power increases. If the voltage of the power-system bus 1 lowers, the voltage fluctuation suppression controller 16 so controls the controller 5 as to reduce the lagging reactive power output.

The above operation will be described in more detail below with reference to the control block circuit in FIG. 14. When the voltage of the power-system bus 1 rises, the voltage deviation ΔV increases. In accordance with this result, the reactive power reference Q as an output from the gain unit 16-2 also increases. When the reactive power reference Q increases, a command value of the phase difference δ as an output from the reactive power reference value Q-phase difference δ converter 16-3 increases.

Consequently, the controller 5 and a driving system 4 increase the phase difference δ of the phase shifter 2, thereby increasing the reactive power consumed by the impedance load 3 of the phase shifter 2. This suppresses the voltage rise.

On the other hand, when the impedance load 3 is a capacitor, a leading reactive power is output. The polarity (positive or negative) of the gain of the gain unit 16-2 is inverted. In contrast to the above case, if the voltage rises, the command value 16a is output to the controller 5 to decrease the phase difference δ between the stator and the rotor, so as to reduce the output of the leading reactive power. If the voltage lowers, the command value 16a is output to the controller 5 to increase the phase difference δ, so as to increase the leading reactive power output. This continuously adjusts the reactive power to suppress voltage fluctuations on the power-system bus 1.

In the voltage deviation detection method explained in FIG. 14, the voltage is compared with the fixed reference voltage. However, it is also possible to use a method (floating reference) which changes the reference voltage itself in accordance with the system state. In addition, the method in the gain unit 16-2 need not be the one using a simple proportional gain but can also be a method of proportional integral (PI) control in order to eliminate offset of the voltage deviation. Furthermore, if a nonlinear response change is not a big problem, Q-δ conversion can be omitted, and the output from the gain unit 16-2 can be used as the output of the voltage fluctuation suppression controller 16.

In the seventh embodiment as described above, the voltage fluctuation suppression controller 16 outputs a command value to the controller 5 to decrease the voltage deviation ΔV, so as to continuously adjust the reactive power, thereby suppressing voltage fluctuations on the power-system bus 1. In addition, the system can be implemented with a low cost.

The following inventions can be derived from the above embodiments. Note that the present invention is not restricted to the above embodiments or the following inventions and can be variously modified within the scope of the gist of the invention. Note also that the above embodiments or the following inventions can be applied singly or in the form of an arbitrary combination.

A power adjustment apparatus according to a first aspect of the present invention is characterized by comprising: a phase shifter including a stator having a stator winding and a rotor having a rotor winding, a winding terminal of one of the stator winding and the rotor winding being connected to a power-system bus, and a winding terminal of the other being connected to the power-system bus via an impedance load; a driver axially coupled to the rotor to drive the rotor; and a controller which outputs a command to the driver value to adjust a phase difference between the stator and the rotor to a desired value.

In the first aspect of the present invention, the driver generates a torque in accordance with a command from the controller, thereby adjusting the rotating angle between the stator and the rotor. Accordingly, it is possible to continuously adjust the value of an electric current flowing into the power adjustment apparatus, i.e., the value of power consumed by the power adjustment apparatus. Additionally, the value of the active or reactive power can be continuously adjusted in the power system or in the load.

Preferred manners of the power adjustment apparatus according to the first aspect are as follows. Note that the following embodiments can be applied singly or in the form of an arbitrary combination.

(1) A transformer connected between the power-system bus and the rotor winding of the phase shifter is provided. By using the step-up transformer, the phase shifter can be appropriately designed in respect of cost.

(2) The impedance load is at least one of a resistance, reactor and a capacitor. The value of the active power, lagging reactive power, and/or leading reactive power consumed in the impedance load, reactor, and/or capacitor is continuously adjusted. This makes it possible to continuously adjust the value of the active power, lagging reactive power, and/or leading reactive power in the power system or in the load.

A power adjustment apparatus according to a second aspect of the present invention is characterized by comprising: a phase shifter including a stator having a stator winding and a rotor having a rotor winding, winding terminals of the stator winding and the rotor winding being connected to a power-system bus; a driver axially coupled to the rotor to drive the rotor; and a controller which outputs a command to the driver value to adjust a phase difference between the stator and the rotor to a desired value. In the second aspect, the value of the lagging reactive power consumed in the leakage reactance of the phase shifter itself is continuously adjusted. Consequently, the reactive power can be continuously adjusted in the power system or in the load. In this case, it is preferred to further comprise a transformer connected between the power-system bus and the rotor winding of the phase shifter.

Preferred embodiments of the power adjustment apparatuses according to the first and second aspects are as follows. Note that the following embodiments can be applied singly or in the form of an arbitrary combination.

(1) One of a capacitor and reactor connected to the power-system bus is further provided. The value of the consumed reactive power is continuously adjusted from a lead to a lag. Accordingly, the value of the reactive power can be continuously adjusted from a lead to a lag in the power system or in the load.

(2) In item (1) above, a power system stabilizing system is further provided, and the power-system bus has a synchronous generator, and the power system stabilizing system receives a detected speed value from the synchronous generator, calculates a command value of the rotating angle of the rotor in accordance with a deviation between the detected speed and a set value, and outputs the command value to the driver via the controller. By adjusting the power consumed in the resistance load, the stability of the synchronous generator can be improved.

(3) A closing circuit breaker between the power-system bus and the phase shifter is further provided, and wherein the power system stabilizing system closes or opens the closing circuit breaker. In normal state, the closing circuit breaker is kept open to disconnect the phase shifter from the power system. Only when the synchronous generator accelerates owing to a failure, the circuit breaker is closed. This reduces power loss and shortens the operation start time in normal state.

(4) A voltage fluctuation suppression controller which receives a bus voltage detected on the power-system bus, calculates a command value of the rotating angle of the rotor in accordance with the magnitude of the bus voltage, and outputs the command value to the controller is further provided. By adjusting the reactive power consumed in the impedance load, voltage fluctuations in the power-system bus can be suppressed.

As has been explained above, the present invention can provide, at a low cost, a power adjustment apparatus in which a controller and a driver continuously adjust the phase difference between a stator and a rotor of a phase shifter, and the power consumption is adjusted in accordance with the phase difference, and which thereby can perform fine adjustment in accordance with a load power command and also reduces power loss.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power adjustment apparatus comprising:
    a phase shifter including a stator having a stator winding and a rotor having a rotor winding, a winding terminal of one of said stator winding and said rotor winding being connected to a power-system bus, and a winding terminal of the other being connected to said power-system bus via an impedance load;
    a driver axially coupled to said rotor to drive said rotor; and
    a controller which outputs a command to said driver to adjust a phase difference between said stator and said rotor to a desired value.

2. The apparatus according to claim 1, further comprising one of a capacitor and a reactor connected to said power-system bus.

3. The apparatus according to claim 1, further comprising a power system stabilizing system,
    wherein said power-system bus has a synchronous generator, and
    said power system stabilizing system receives a detected speed value from said synchronous generator, calculates a command value of the rotating angle of said rotor in accordance with a deviation between the detected speed and a set value, and outputs the command value to said driver via said controller.

4. The apparatus according to claim 3, further comprising a closing circuit breaker between said power-system bus and said phase shifter,
    wherein said power system stabilizing system closes or opens said closing circuit breaker.

5. The apparatus according to claim 1, further comprising a transformer connected between said power-system bus and said rotor winding of said phase shifter.

6. The apparatus according to claim 1, wherein said impedance load is at least one of a resistance reactor and a capacitor.

7. The apparatus according to claim 6, further comprising a voltage fluctuation suppression controller which receives a bus voltage detected on said power-system bus, calculates a command value of the rotating angle of said rotor in accordance with the magnitude of the bus voltage, and outputs the command value to said controller.

8. A power adjustment apparatus comprising:
    a phase shifter including a stator having a stator winding and a rotor having a rotor winding, winding terminals of said stator winding and said rotor winding being directly connected to a power-system bus, the phase shifter having a leakage impedance of said stator and said rotor;
    a driver axially coupled to said rotor to drive said rotor; and
    a controller which outputs a command to said driver to adjust a phase difference between said stator and said rotor to a desired value to control power consumed by the leakage impedance.

9. The apparatus according to claim 8, further comprising a transformer connected between said power-system bus and said rotor winding of said phase shifter.

10. The apparatus according to claim 8, further comprising one of a capacitor and a reactor connected to said power-system bus.

11. The apparatus according to claim 8, further comprising a voltage fluctuation suppression controller which receives a bus voltage detected on said power-system bus, calculates a command value of the rotating angle of said rotor in accordance with the magnitude of the bus voltage, and outputs the command value to said controller.

* * * * *

UNITED STATES PATENT AND TRADEMARK OFFICE
CERTIFICATE OF CORRECTION

PATENT NO. : 6,806,688 B2
DATED : October 19, 2004
INVENTOR(S) : Noro et al.

It is certified that error appears in the above-identified patent and that said Letters Patent is hereby corrected as shown below:

Title page, Item [54] and Column 1, line 1,
Title, should read -- PHASE DIFFERENCE POWER ADJUSTMENT APPARATUS HAVING A CAPACITOR AND REACTOR CONNECTED POWER-SYSTEM BUS --

Signed and Sealed this

First Day of February, 2005

JON W. DUDAS
*Director of the United States Patent and Trademark Office*